US 9,695,795 B2

(12) United States Patent
Martin et al.

(10) Patent No.: US 9,695,795 B2
(45) Date of Patent: Jul. 4, 2017

(54) PRESSURE EXCHANGE NOISE REDUCTION

(75) Inventors: Jeremy Martin, Oakland, CA (US);
Shervin Nadershahi, Los Angeles, CA (US); James Arluck, Hayward, CA (US)

(73) Assignee: Energy Recovery, Inc., San Leandro, CA (US)

( * ) Notice: Subject to any disclaimer, the term of this patent is extended or adjusted under 35 U.S.C. 154(b) by 1061 days.

(21) Appl. No.: 13/450,794

(22) Filed: Apr. 19, 2012

(65) Prior Publication Data

US 2013/0280038 A1 Oct. 24, 2013

(51) Int. Cl.
F03B 11/00 (2006.01)
F03B 13/00 (2006.01)
F04F 13/00 (2009.01)

(52) U.S. Cl.
CPC ............ *F03B 13/00* (2013.01); *F04F 13/00* (2013.01); *F05B 2220/60* (2013.01); *F05B 2220/62* (2013.01); *Y02B 10/50* (2013.01)

(58) Field of Classification Search
CPC .......... F01D 15/08; F03B 13/00; F03B 11/00; F04B 35/00; F04F 13/00
USPC ...... 415/116, 202, 214.1; 417/269, 393, 401
See application file for complete search history.

(56) References Cited

U.S. PATENT DOCUMENTS

| | | | |
|---|---|---|---|
| 4,360,316 A | 11/1982 | Rahnke | |
| 4,550,645 A | 11/1985 | Beck, Jr. | |
| 4,859,153 A | 8/1989 | Mayer | |
| 5,230,274 A | 7/1993 | Yu et al. | |
| 6,449,939 B1 | 9/2002 | Snyder | |
| 7,871,522 B2 | 1/2011 | Stover et al. | |
| 7,997,853 B2 | 8/2011 | Pique et al. | |
| 8,075,281 B2 | 12/2011 | Martin et al. | |
| 2005/0063834 A1 | 3/2005 | Esders | |
| 2006/0032808 A1 | 2/2006 | Hauge | |
| 2010/0196152 A1* | 8/2010 | Pique et al. | 415/208.1 |

FOREIGN PATENT DOCUMENTS

| | | |
|---|---|---|
| CN | 101568733 A | 10/2009 |
| CN | 101821482 A | 9/2010 |
| EP | 0974753 A2 | 1/2000 |
| KR | 2001-0030868 | 4/2001 |
| KR | 2009-0029204 A | 3/2009 |
| KR | 2010-0088132 A | 8/2010 |

(Continued)

OTHER PUBLICATIONS

PCT International Search Report and Written Opinion; Application No. PCT/US2013/033372; Dated May 30, 2013; 9 pages.

(Continued)

*Primary Examiner* — Gregory Anderson
*Assistant Examiner* — Maxime Adjagbe
(74) *Attorney, Agent, or Firm* — Fletcher Yoder, P.C.

(57) ABSTRACT

Various aspects of the technology provide for reducing noise and vibration in a pressure exchanger for high pressure fluid handling equipment such as a desalination system, by disposing grooves between a seal surface and a port. The groove reduces a hammer effect in moving high pressure fluid to a low pressure port and moving low pressure fluid to a high pressure port. Reduction in the hammer effect, in addition to reducing noise, reduces vibration that can cause deterioration of high pressure fluid handling equipment.

22 Claims, 12 Drawing Sheets

(56) References Cited

FOREIGN PATENT DOCUMENTS

WO      2005/116456 A1    12/2005
WO      2009/046429 A2    4/2009

OTHER PUBLICATIONS

KR Office Action; KR Patent Application No. 2001-0030868; dated Nov. 2, 2015.
EP Extended Search Report; Application No. EP13779074.7; Dated Mar. 1, 2016; 8 pages.
KR Second Office Action and English Translation; Application No. KR 10-2014-7032474; Dated May 12, 2016; 11 pages.
Third KR Office Action and English Translation; Application No. KR 2014-7032474; Dated Nov. 28, 2016; 9 pages.

* cited by examiner

PRESSURE EXCHANGE NOISE REDUCTION

BACKGROUND OF THE INVENTION

1. Technical Field

The present invention relates to desalination equipment, and more particularly to pressure exchange devices.

2. Background

A pressure exchange device may recover potential energy that is stored in a compressed fluid. A typical application for a pressure exchange device is in a desalination system. For example, seawater may be compressed to a high pressure, and reverse osmosis may be used to extract fresh water from the compressed seawater resulting in a high pressure brine byproduct. If the high pressure brine is discarded then the energy used to compress that volume of concentrate is also wasted. A pressure exchange device may use the high pressure brine to compress seawater for further fresh water extraction. Unfortunately, a pressure exchange device generates substantial noise when the brine and seawater undergo sudden changes in pressure during the pressure exchange. The noise is characteristic of vibration and stress that can degrade the extraction equipment including the pressure exchanger, pipes, manifolds, pumps, turbines, filters, and membranes.

SUMMARY

Noise results from an almost instantaneous change in pressure, or impulse, as a high pressure fluid suddenly comes into contact with a low pressure fluid in a pressure exchanger. The impulse occurs at the edge of a port opening where a previously sealed duct is brought into communication with fluid in the port. For example, high pressure fluid in a sealed duct may be brought into communication with low pressure fluid in a port. In another example, low pressure fluid in a sealed duct may be brought into communication with high pressure fluid in a port. The noise caused at the interface of high pressure and low pressure fluid may be reduced by using a groove extending from the port into the sealing surface to release a small portion of the fluid before all the fluid reaches the edge. The pressure energy stored in the high pressure fluid is applied through the groove to the low pressure fluid to reduce the amount of energy wasted due to noise, turbulence, frictional loses, boundary layer shear, cavitation, flow erosion, and/or the like. The broad groove may extend across a substantial width of the port. The groove may be inclined from the edge of the port into the port similar to a ramp to provide a variable amount of flow through the groove as the duct sweeps across the incline. A width and/or depth of the groove may be varied along the length of the groove to provide a variable amount of flow through the groove as the duct sweeps along the length of the groove.

Various aspects of an energy recovery apparatus comprises a rotor configured to move a duct containing low pressure fluid into alignment with a high pressure fluid source port for replacement of low pressure fluid in the duct with high pressure fluid. The rotor further is configured to move the duct while containing high pressure fluid into alignment with a low pressure release port for release of the high pressure fluid within the duct to low pressure. A high pressure seal surface adjacent to the low pressure release port may maintain high pressure on fluid in the duct during movement of the duct into alignment with the low pressure release port. A ramp forming a transition between the high pressure seal surface and the low pressure release port may be configured to bleed off pressure from fluid in the duct as the rotor moves the duct over the ramp into alignment with the release port.

Various embodiments of an energy recovery device comprises a feed-water end cover, and a concentrate end cover. A low pressure feed-water source port may be disposed in the feed-water end cover. A high pressure concentrate source port may be disposed in the concentrate end cover. A duct may be configured to receive low pressure feed-water from the low pressure feed-water source port and high pressure concentrate from the high pressure concentrate source port. A rotor may be configured to position the duct in alignment with the low pressure feed-water source port, and to position the duct in alignment with the high pressure concentrate source port. A high pressure sealing surface may be disposed in a face of the feed-water end cover and adjacent the low pressure feed-water source port. The high pressure sealing surface may be configured for maintaining high pressure on concentrate and/or maintaining a seal between the high and low pressure regions of the ports and the ducts. A groove between the high pressure sealing surface and the low pressure feed-water source port may be configured to release pressure on the concentrate in the duct.

In various embodiments, a pressure recovery apparatus comprises a rotor including a duct and configured to move the duct and low pressure fluid in the duct to a first position, and to move the duct and high pressure fluid in the duct to a second position. The apparatus further comprises a high pressure input port disposed in the first end cover, the high pressure input port configured to admit high pressure fluid for compressing low pressure fluid and displacing compressed fluid while the rotor is in the first position, and a high pressure output port disposed in the second end cover, the high pressure output port configured to release compressed fluid while the rotor is in the first position. The apparatus further comprises a low pressure output port disposed in a first end cover, the low pressure output port configured to release decompressed high pressure fluid from the duct at low pressure while the duct is at the second position and a low pressure input port disposed in a second end cover, the low pressure input port configured to admit low pressure fluid into the duct to displace decompressed fluid while the duct is at the second position. The first end cover includes a first high pressure seal surface adjacent the low pressure output port and a first groove between the first high pressure seal surface and the low pressure output port. The first groove may be configured to release pressure and decompress high pressure fluid in the duct as the rotor moves the duct over the first groove and into alignment with the low pressure output port. The second end cover includes a second high pressure seal surface adjacent the low pressure input port. A second groove may be disposed between the second high pressure seal surface and the low pressure input port. The second groove may be configured to release pressure and decompress high pressure fluid in the duct as the rotor moves the duct into alignment with the low pressure input port.

In various embodiments, an energy recovery apparatus includes a rotor configured to rotate a duct containing a fluid and an end cover comprising a low pressure port and a high pressure seal surface adjacent the low pressure port, the high pressure seal surface configured maintain high pressure on fluid in the duct during rotation of the duct. The end cover further includes a release ramp between the high pressure seal surface and the low pressure port. The release ramp may be configured for decreasing pressure on fluid in the duct incrementally as the rotor rotates the duct from the high pressure seal surface over the release ramp into alignment with the low pressure port. The end cover may further include a high pressure port and a low pressure seal surface adjacent the high pressure port, the low pressure seal surface configured maintain low pressure on fluid in the duct during rotation of the duct. The end may also include a pressure ramp between the low pressure seal surface and the high pressure port. The pressure ramp may be configured for increasing pressure on fluid in the duct incrementally as the rotor rotates the duct from the low pressure seal surface over the ramp into alignment with the high pressure port.

DETAILED DESCRIPTION

Figure 1:
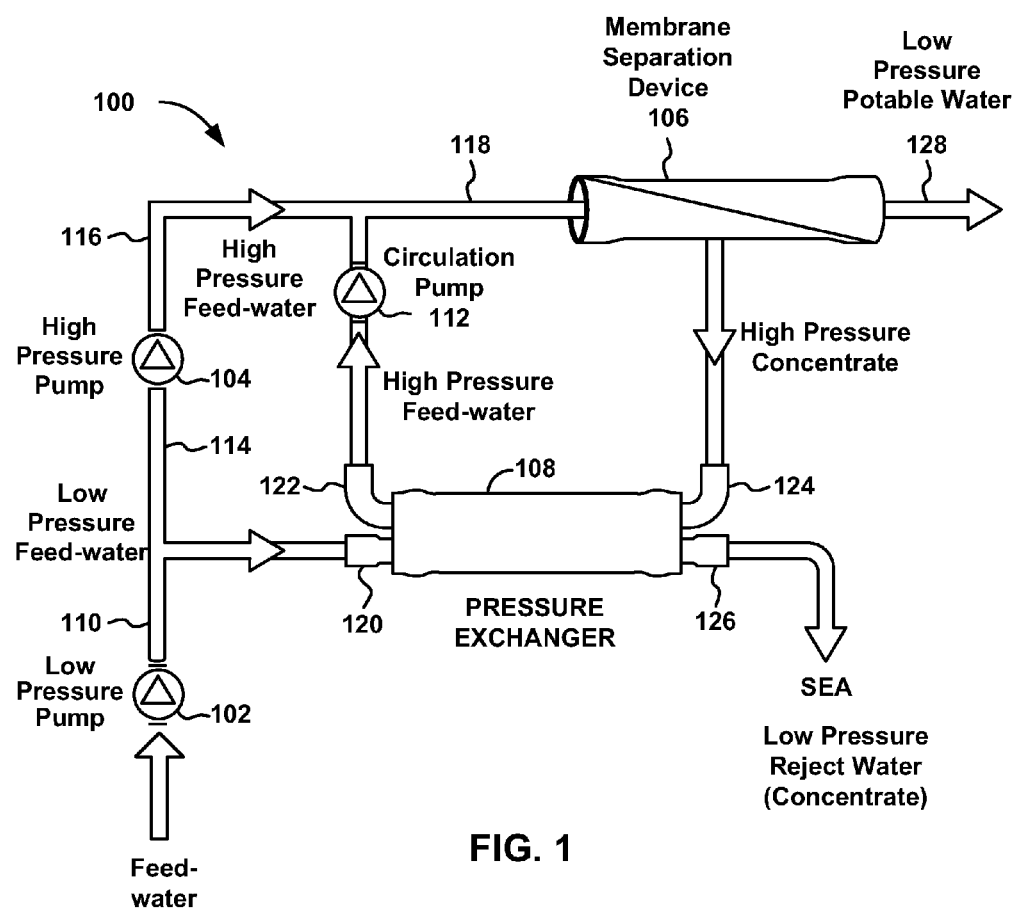
FIG. 1 shows a block diagram illustrating a desalination system including a pressure exchange device, in accordance with various embodiments of the invention.

FIG. 1 shows a block diagram illustrating a desalination system 100 including a pressure exchange apparatus 108, in accordance with various embodiments of the invention. The desalination system 100 further includes a low pressure pump 102 for pumping feed-water into the system 100. A high pressure pump 104 provides high pressure feed-water to a feed-water separation device or a membrane separation device configured for separating fluids traversing a membrane, such as a reverse osmosis membrane 106. Concentrated feed-water or concentrate from the membrane separation device 106 may be provided to the pressure exchanger 108. An example of a concentrate is brine. Pressure in the concentrate may be used in the pressure exchanger 108 for compressing low pressure feed-water to high pressure feed-water. For simplicity and illustration purposes, the term feed water is used in the detailed description and FIGS. 1-6. However, fluids other than water may be used in the pressure exchanger 108.

The low pressure pump 102 may receive feed-water from a reservoir or directly from the ocean and pump the feed-water at low pressure into the system 100 at position 110. Low pressure feed-water at position 110 may be provided to the high pressure pump 104 via manifold 114 and to the pressure exchanger 108 via manifold 120. High pressure feed-water at position 116 may be provided to the membrane separation device 106 via manifold 118. The membrane may separate fresh water for output to manifold 128 at low pressure.

Concentrate from the membrane separation device 106 may be provided to the pressure exchanger 108 via manifold 124. The pressure exchanger 108 may use high pressure concentrate from manifold 124 to compress (or exchange pressure with) low pressure feed-water from manifold 120. The compressed feed-water may be provided to the membrane separation device 106 via manifold 122, which is coupled to manifold 118. The pressure exchanger 108 may output concentrate at low pressure via manifold 126. Thus, concentrate that has given up pressure to the feed-water may be output from the pressure exchanger 108 at low pressure to manifold 126. The low pressure concentrate in manifold 126 may be discarded, e.g., released for return to the sea.

In some embodiments, the high pressure feed-water is output from the pressure exchanger 108 to manifold 122 at a slightly lower pressure than the high pressure feed-water in manifold 118 An optional circulation pump 112 may makeup the small difference in pressure between feed-water in manifold 122 and manifold 118. In some embodiments, the circulation pump 112 is a turbine. Table 1 provides an example of some typical pressures in a desalination system illustrated in FIG. 1.

TABLE 1

| High Pressure Pump-Membrane Manifold 116 & 118 | Low Pressure Feed-water Manifold 120 | High Pressure Feed-water Manifold 122 | High Pressure Concentrate Manifold 124 | Low Pressure Concentrate Manifold 126 |
| --- | --- | --- | --- | --- |
| 1,000 PSI | 30 PSI | 965 PSI | 980 PSI | 15 PSI |

In the example illustrated by Table 1, the pressure exchanger 108 receives low pressure feed-water at about 30 pounds per square inch (PSI) and receives high pressure brine or concentrate at about 980 PSI. The pressure exchanger 108 transfers pressure from the high pressure concentrate to the low pressure feed-water. The pressure exchanger 108 outputs high pressure (compressed) feed-water at about 965 PSI and low pressure concentrate at about 15 PSI. Thus, the pressure exchanger 108 of Table 1 may be about 97% efficient since the input volume is about equal to the output volume of the pressure exchanger 108 and 965 PSI is about 97% of 980 PSI.

Figure 2A:
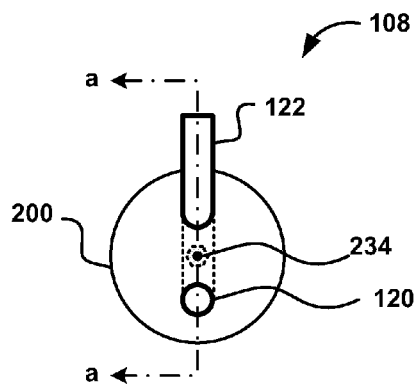
FIG. 2A is a block diagram of a front elevation illustrating an end view of the pressure exchange apparatus of FIG. 1.
Figure 2B:
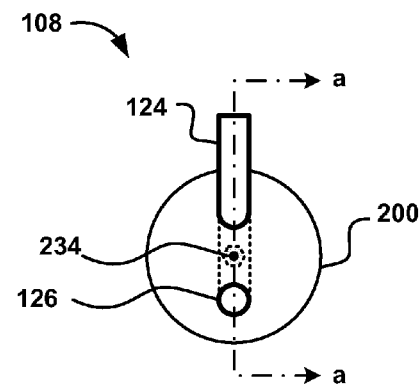
FIG. 2B is a block diagram of a rear elevation illustrating an end view of the pressure exchange apparatus of FIG. 1.
Figure 2C:
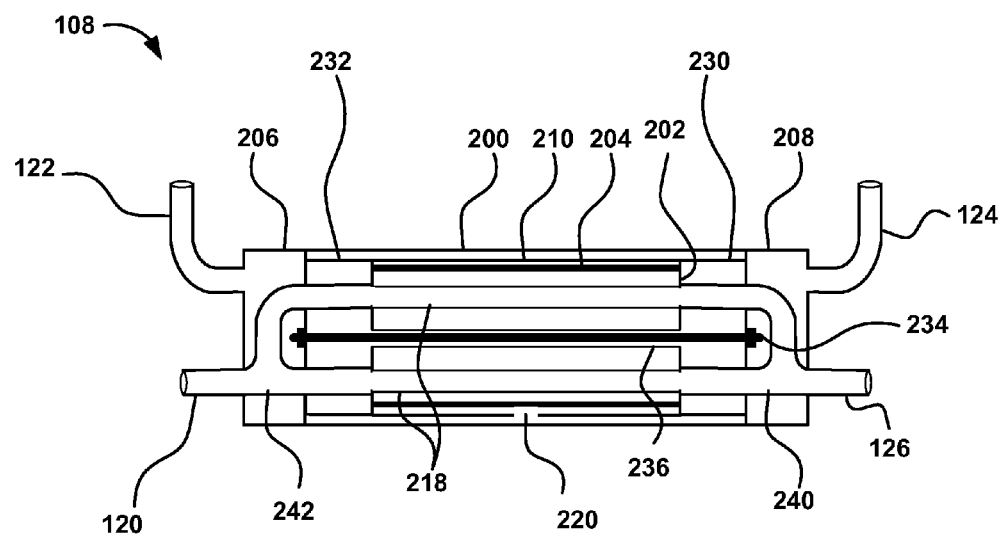
FIG. 2C is a block diagram of a cross section view of the pressure exchange apparatus of FIG. 1 along line a-a of FIGS. 2A and 2B.

FIG. 2A is a front elevation illustrating an end view of the pressure exchange apparatus 108 of FIG. 2C, in accordance with various embodiments of the invention. FIG. 2B is a rear elevation illustrating an end view of the pressure exchange apparatus 108 of FIG. 2C, in accordance with various embodiments of the invention. FIG. 2C is a cross section view of the pressure exchange apparatus 108 of FIG. 1 along line a-a, in accordance with various embodiments of the invention. The pressure exchanger 108 of FIGS. 2A and 2B includes a feed-water plenum 206, a feed-water end cover 232, a housing or case 200, a sleeve 210, a rotor 202, a lubrication space 204 between the sleeve 210 and the rotor 202, a concentrate end cover 230, and a concentrate plenum 208.

High pressure feed-water may flow from the feed-water end cover 232 through the feed-water plenum 206 to the high pressure feed-water manifold 122. The low pressure feed-water manifold 120 of FIG. 2A may be coupled to the feed-water end cover 232 through a feed-water manifold 242. The dotted line of FIG. 2A illustrates an internal portion of the feed-water manifold 242 and shaft 234. The feed-water manifold 242 is configured to separate low pressure feed-water in the feed-water manifold 242 from high pressure feed-water and shaft 234 in the feed-water plenum 206.

Similarly, brine or concentrate may flow from the high pressure concentrate manifold 124 through the concentrate plenum 208 to the concentrate end cover 230. The low pressure concentrate manifold 126 of FIG. 2B may be coupled to the concentrate end cover 230 through a concentrate manifold 240. The dotted line of FIG. 2B illustrates an internal portion of the concentrate manifold 240 and shaft 234. The concentrate manifold 240 is configured to separate low pressure concentrate in the concentrate manifold 240 from high pressure concentrate in the concentrate plenum 208. The low pressure concentrate manifold 240 and the low pressure feed-water manifold 242 are illustrated in FIGS. 2A and 2B as dividing into two branches. However, the low pressure concentrate manifold 240 and the low pressure feed-water manifold 242 may separate into more or fewer branches.

The rotor 202 may be suspended within a sleeve 210 and free to rotate. A lubrication space 204 between the sleeve 210 and the rotor 202 is configured to receive a lubrication fluid through a lube port 220 for suspending the rotor 202 within the sleeve 210. The lubrication fluid may be feed-water or concentrate at high pressure. For example, high pressure concentrate may be bled off from the high pressure concentrate plenum 208 and coupled to the lube port 220. In various embodiments, high pressure feed-water may be bled off from the high pressure feed-water plenum 206, or other sources and coupled to the lube port 220. Similarly, low pressure feed-water may be coupled from low pressure pump 102, position 110, low pressure feed-water manifold 120, manifold 114 and/or other sources to the lube port 220. A shaft 234 is configured to apply tension for clamping the feed-water end cover 232 and the concentrate end cover 230 to the sleeve 210. A bore 236 through the rotor 202 may provide a path for the shaft 234 without touching or applying drag to the rotor 202.

The rotor 202 includes one or more ducts 218 configured to move feed-water and concentrate at high and low pressures. The ducts 218 extend through the length of the rotor from the feed-water end cover 232 to the concentrate end cover 230. The ducts are configured to receive low pressure feed-water through the feed-water end cover 232, and to receive high pressure concentrate from the high pressure concentrate manifold 124, though the concentrate end cover 230. The ducts are further configured to provide high pressure feed-water to the feed-water end cover 232, and to provide low pressure concentrate to the concentrate end cover 230. Rotation of the rotor 202 moves or rotates the ducts 218 in a circular path around the pressure exchanger 108. Rotation of the ducts 218 in a circular path between the end covers 230 and 232 is configured to align the ducts between ports in the end covers for receiving low pressure feed-water and high pressure concentrate and providing high pressure feed-water and low pressure concentrate. While two ducts 218 are illustrated in FIG. 2C, in various embodiments, 1, 2, 3, 4, 5, 6, 7, 8, 9, 10, 11, 12, 13, 14, 15, 18, 20, 24, 30 or more ducts may be used in the rotor 202.

Figure 3A:
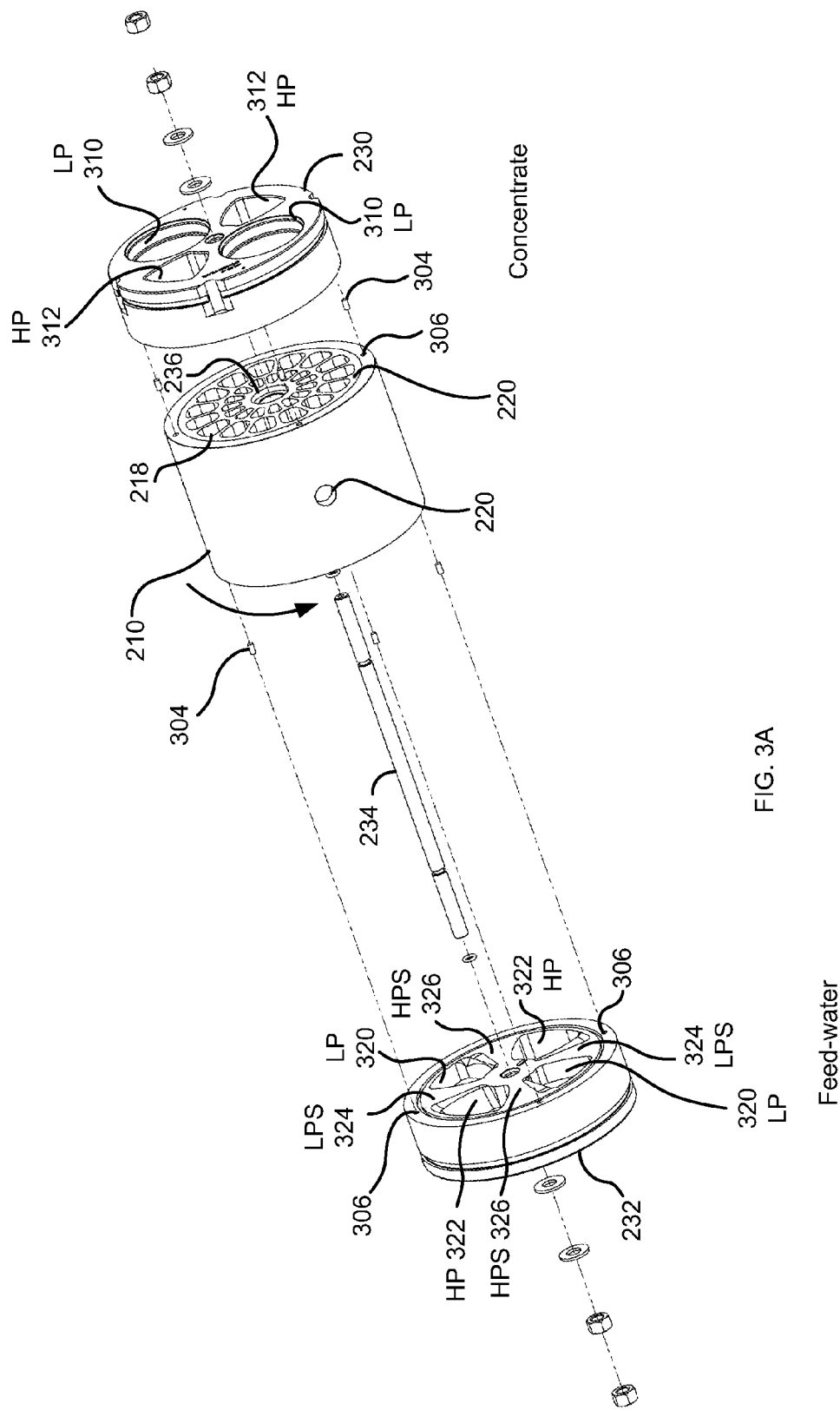
FIG. 3A is a front perspective of an exploded view of components of the pressure exchange apparatus of FIG. 2C.
Figure 3B:
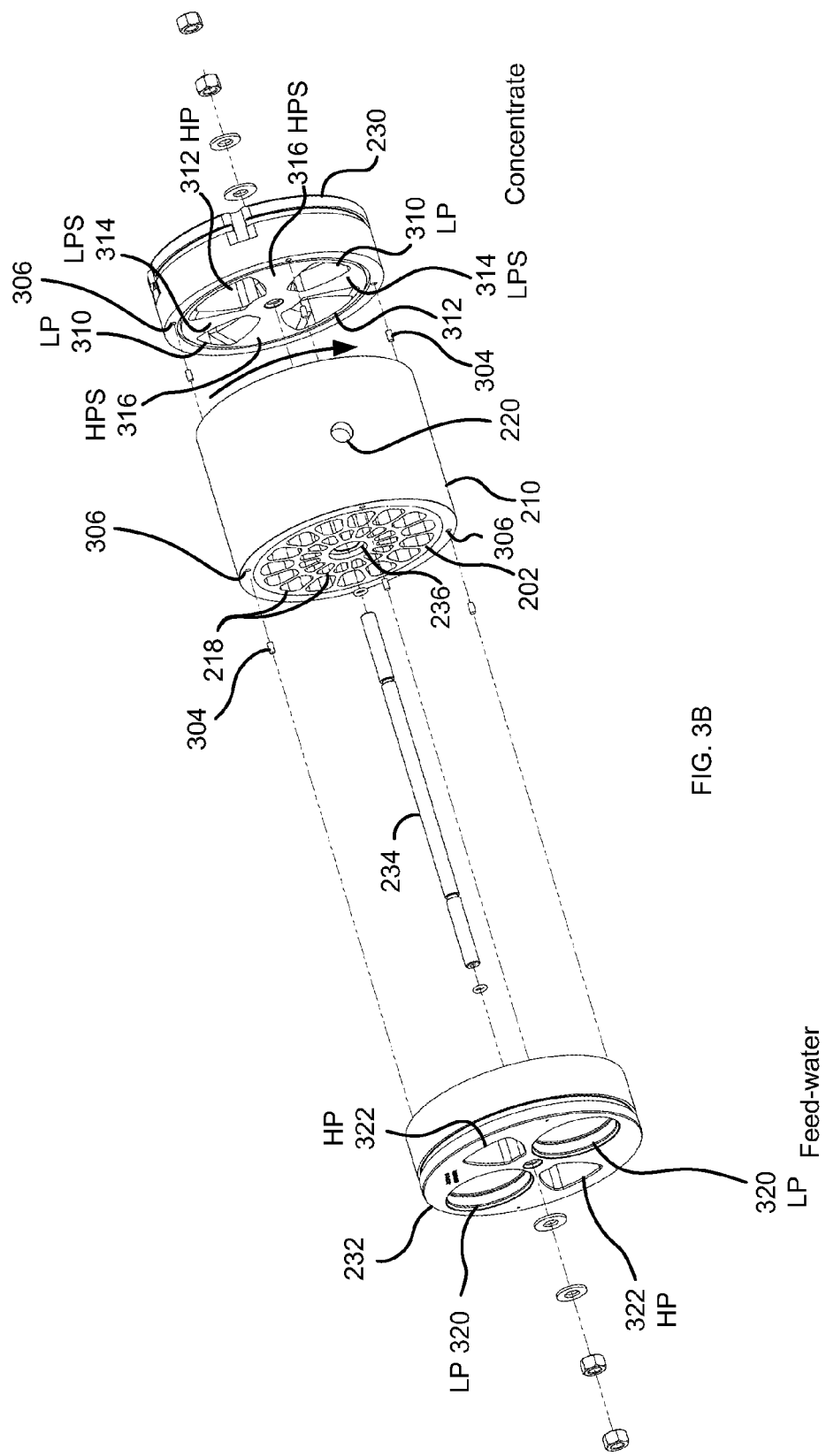
FIG. 3B is a rear perspective of an exploded view of components of the pressure exchange apparatus of FIG. 2C.
Figure 3C:
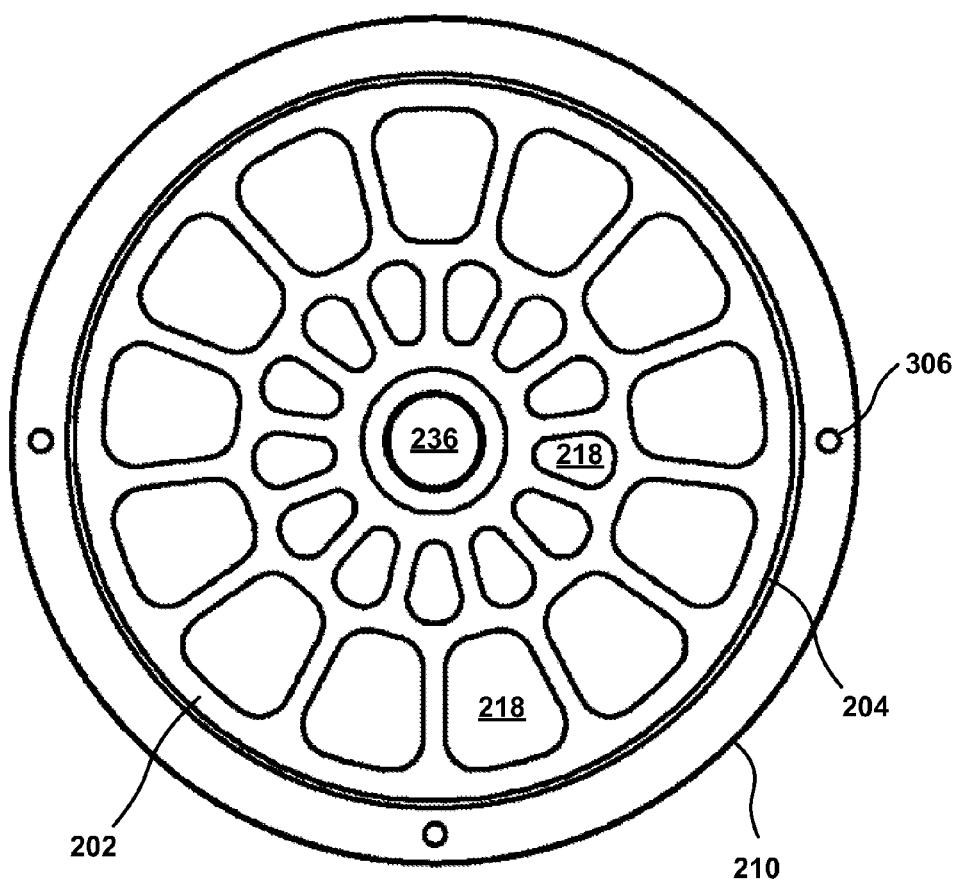
FIG. 3C shows an end elevation of the rotor and sleeve of FIGS. 3A and 3B, in accordance with embodiments of the invention.

FIG. 3A is a front perspective of an exploded view of components of the pressure exchange apparatus 108 of FIG. 2, in accordance with various embodiments of the invention. FIG. 3B is a rear perspective of an exploded view of components of the pressure exchange apparatus 108 of FIG. 2, in accordance with various embodiments of the invention. FIG. 3C shows an end elevation of the rotor 202 and sleeve 210 of FIG. 2, in accordance with embodiments of the invention. The feed-water plenum 206, feed-water manifold 242, housing 200, concentrate plenum, and concentrate manifold 240 are omitted for clarity. The feed-water end cover 232 includes one or more low pressure feed-water ports 320 and one or more high pressure feed-water ports 322. One or more feed-water low pressure seal surface 324 and feed-water high pressure seal surface 326 is disposed on a side facing the rotor 202. The feed-water low pressure seal surface 324 is configured for maintaining low pressure within a duct 218 during rotation of the duct 218 from a low pressure feed-water port 320 to a high pressure feed-water port 322. Similarly, the feed-water high pressure seal surface 326 is configured for maintaining a high pressure within a duct 218 during rotation of the duct 218 from a high pressure feed-water port 322 to an adjacent low pressure feed-water port 320. The low pressure feed-water ports 320 may be circular for coupling to the low pressure feed-water manifold 242.

The concentrate end cover 230 includes one or more low pressure concentrate ports 310 and one or more high pressure concentrate ports 312. One or more concentrate low pressure seal surface 314 and concentrate high pressure seal surface 316 is disposed on a side facing the rotor 202. The concentrate low pressure seal surface 314 is configured for maintaining a low pressure within a duct 218 during rotation of the duct 218 from a low pressure concentrate port 310 to an adjacent high pressure concentrate port 312. Similarly, the concentrate high pressure seal surface 316 is configured for maintaining high pressure within a duct 218 during rotation of the duct 218 from a high pressure concentrate port 312 to an adjacent low pressure concentrate port 310. The low pressure concentrate ports 310 may be circular for coupling to the low pressure concentrate manifold 240.

Alignment pins 304 and alignment holes 306 provide for alignment of end covers 232 and 230 in a desired orientation. Three pins distributed asymmetrically about the periphery of the sleeve 210 may provide for a unique alignment. In some embodiments, low pressure feed-water ports 320 and high pressure feed-water ports 322 are partly out of phase with low pressure concentrate ports 310 and high pressure concentrate ports 312, respectively. Fasteners, such as nuts and washers may be disposed on the shaft 234 and may be used to secure the end covers 230 and 232 to the sleeve 210. In some embodiments, the fasteners may be to secure the feed-water plenum 206 and the concentrate plenum 208 to the sleeve 210 and end covers 230 and 232.

As the rotor 202 spins the open ends of each duct 218 move from alignment with one set of ports through a sealed area and then into alignment with another set of ports (e.g., from a high pressure port to a low pressure port or from a low pressure port to a high pressure port). During operation a duct 218 in the sealed area is under approximately the same pressure as the (low or high) pressure of the previous port it was exposed to. As the duct 218 transitions from the sealed area to the next port the pressure within the duct 218 is brought to that of the next port. For this pressure change to occur, a finite quantity of fluid travels between the duct 218 and the port in the direction of decreasing pressure. The requisite volume of fluid is a function of the compressibility of the fluid, the pressure differential between the duct 218 and the port, and any change in duct volume due to the elastic deformation of the walls of the duct 218. For isobaric pressure exchanges in seawater, reverse osmosis applications the volume of fluid in question is on the order of 0.3% of the duct volume.

The movement of fluid into or out of the duct 218 as the fluid becomes exposed to the next port is driven by the pressure difference between the duct 218 and the next port. When the pressure difference is higher than about 100 psi (for example, seawater reverse osmosis operates with around 900 psi difference) a rapid pressure change may occur. The pressure change may be characterized as the magnitude of rate of change of pressure (first derivative of pressure with respect to time—dp/dt) within the duct. The rapid pressure change can create both shock waves and cavitating jets within the device. The shock waves cause undesirable noise and vibration and the cavitating jets can cause wear on the components and additional noise.

A groove between the sealed area and the next port provide for a partially restricted flow path between the otherwise sealed volume of fluid in the rotor duct and the next port. The physical dimensions of the groove can be varied to set flow rate through the groove to minimize the peak dp/dt in the duct. The dp/dt may be a function of the time available to pressurize or depressurize the duct 218, the physical space available for the groove, and the volume of fluid that passes through the groove in order to equalize the pressure at a given dp/dt.

In some embodiments, it is desirable to achieve a relatively constant dp/dt during pressurization/depressurization of the duct 218. However, as the pressure difference between a duct and a port decreases, the flow through a groove having a constant cross section decreases. The physical dimensions of the groove for a relatively constant dp/dt may be varied (or increased) over the length of the groove to maintain constant flow through the groove. As the duct 218 first engages a groove the differential pressure is high. Thus, a small effective hydraulic diameter of the groove may be used initially to limit flow through the groove. As the duct 218 progresses along the groove and the differential pressure decreases, an increase in the hydraulic diameter may be used to maintain flow about constant and thus, maintain about a constant dp/dt. In some embodiments the width and/or depth of the groove may be varied to provide a desired dp/dt along the length of the groove.

In various embodiments, the effective hydraulic diameter is a function of the width of the groove, the depth of the groove, the shape of the groove cross section, the number of ducts 218 engaging a groove, and/or the like. Other structures for controlling dp/dt include changing the number of grooves encountered by the ducts 218 as the ducts 218 move from the sealed area to the next port, and creating surfaces within the groove that change size. The effective hydraulic diameter may be changed along the groove in a linear or non-linear fashion.

The energy in the high pressure fluid moving through the groove toward the low pressure fluid is ultimately dissipated through viscous shear frictional losses into the fluid. Two mechanisms for this to occur include a high velocity jet and boundary layer shear. A high velocity jet may be created, for example, by high pressure moving though a small, roughly square cross section opening into a large open area. The pressure energy is first transferred to kinetic energy of rapidly moving fluid in the high pressure jet, and then to frictional losses in the turbulent eddies created by the jet in the open area. Disadvantages of this a high pressure jet include the high velocity fluid within the jet creating flow erosion, noise and destructive cavitation.

Laminar flow dissipation of energy may occur through boundary layer shear within the flow channel. In this case a high aspect ratio groove may be used to maximize the wetted perimeter, which is essentially surface area. The increase in wetted perimeter may enhance the shear flow. The relatively low velocities in the boundary layer do not create significant flow erosion, noise, and cavitation. In some embodiments, grooves may be used on end covers at both ends of the rotor 202 to effectively increase the total wetted perimeter. For example, grooves may be disposed between the sealed area and the high pressure port on both the feed-water end cover 232 and the concentrate end cover 230. The depressurization groove may be eliminated or reduced to one of the end covers (e.g. concentrate end cover 230). The slightly higher pressure on the other end cover (e.g., the feed-water end cover 232) may be used to reduce cavitation potential.

Figure 4A:
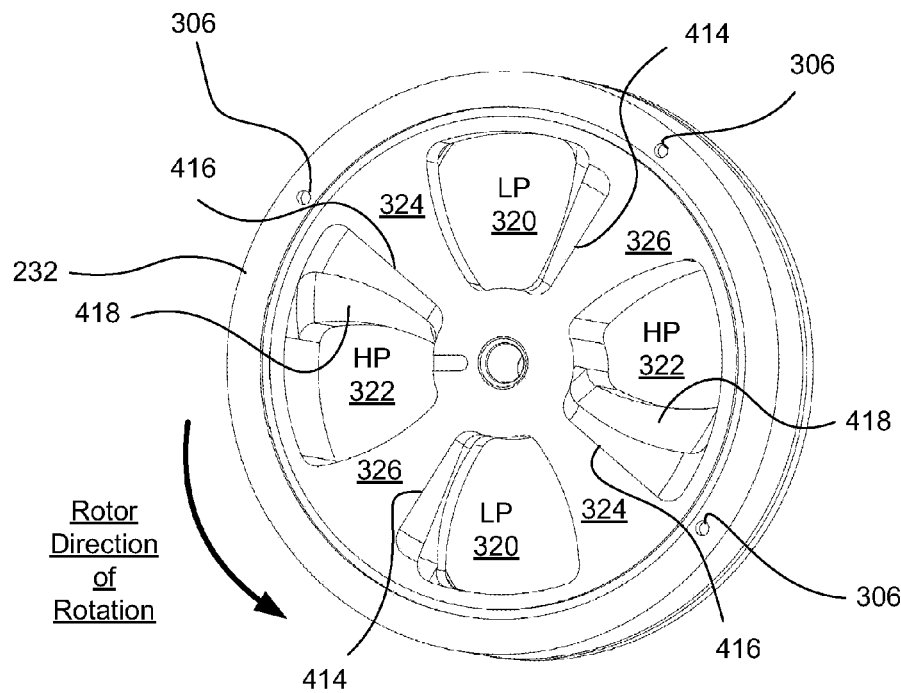
FIG. 4A shows a perspective view of an interior face of the feed-water end cover of FIG. 2, in accordance with embodiments of the invention.
Figure 4B:
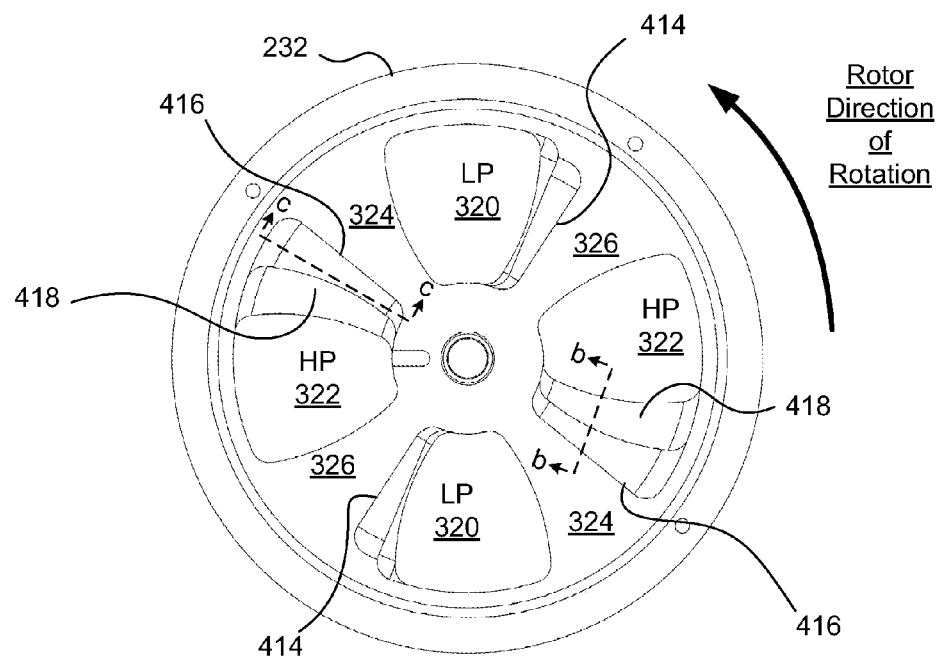
FIG. 4B shows an interior elevation of the feed-water end cover of FIG. 4A.

FIG. 4A shows a perspective view of an interior face of the feed-water end cover 232 of FIGS. 2 and 3A, in accordance with embodiments of the invention. FIG. 4B shows an interior elevation of the feed-water end cover 232 of FIG. 4A. The interior face of the feed-water end cover 232 includes one or more high pressure relief grooves 414 disposed between a high pressure seal surface 326 and a low pressure feed-water port 320. The high pressure relief grooves 414 are configured to bleed high pressure feed-water gradually from the duct 218 into the low pressure feed-water port 320 as the rotor 202 rotates to move the duct 218 over the high pressure relief grooves 414 from the high pressure seal surface 326 to the low pressure feed-water port 320.

The interior face of the feed-water end cover 232 further includes one or more low pressure relief grooves 416 disposed between a low pressure seal surface 324 and a high pressure feed-water port 322. The low pressure relief grooves 416 are configured to bleed high pressure feed-water gradually from the high pressure feed-water port 322 into the duct 218 containing low pressure feed-water as the rotor 202 rotates to move the duct 218 over the low pressure relief grooves 416 from the low pressure seal surface 324 to the high pressure feed-water port 322.

Figure 5A:
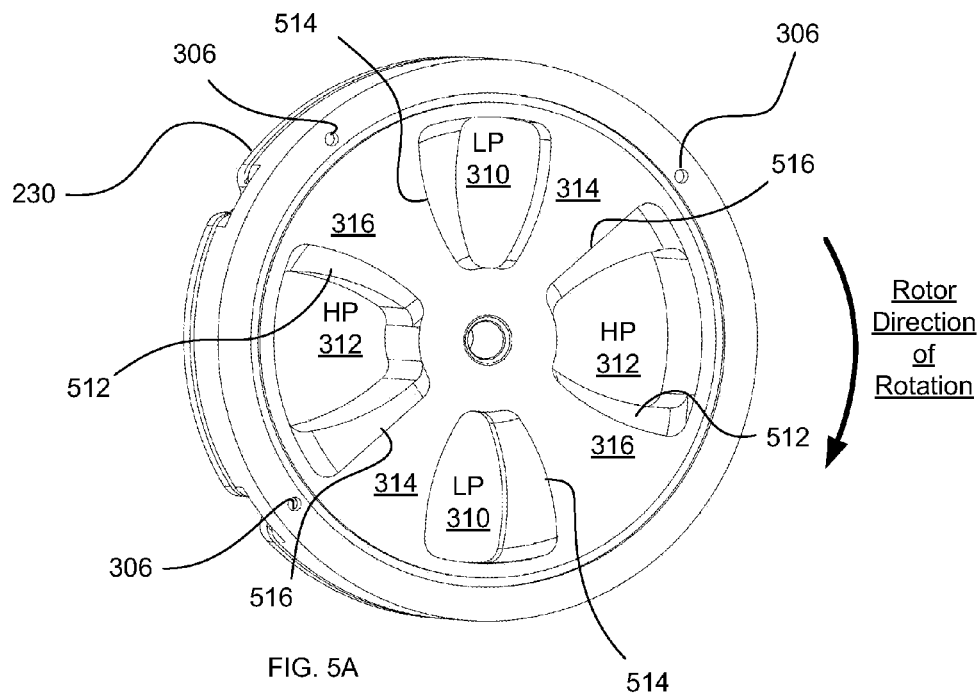
FIG. 5A shows a perspective view of an interior face of the concentrate end cover of FIG. 2, in accordance with embodiments of the invention.
Figure 5B:
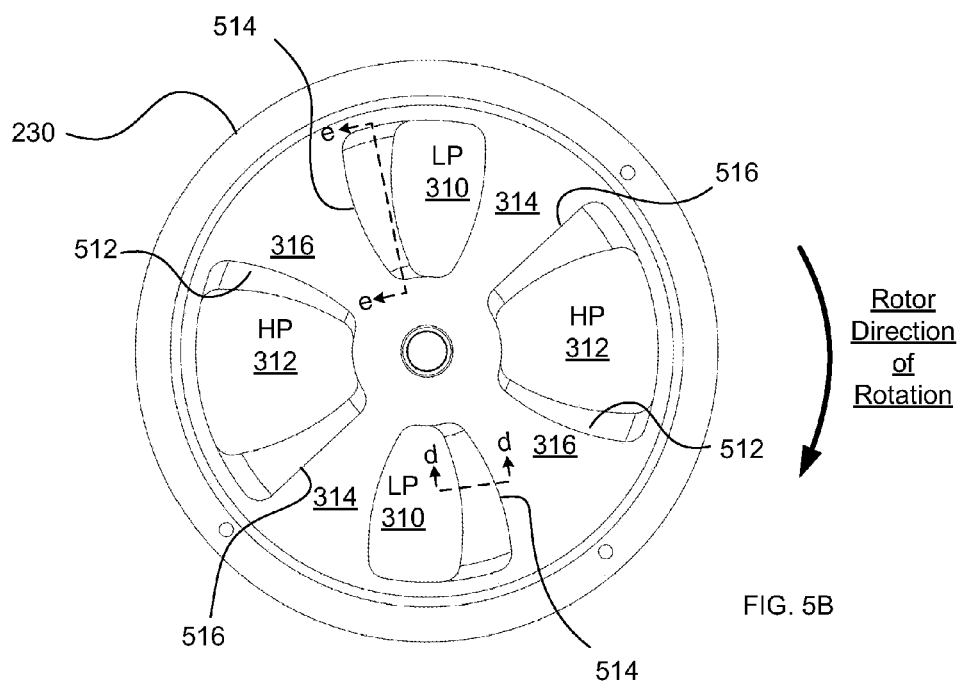
FIG. 5B shows an elevation interior surface of the concentrate end cover of FIG. 5A.

FIG. 5A shows a perspective view of an interior face of the concentrate end cover 230 of FIGS. 2 and 3B, in accordance with embodiments of the invention. FIG. 5B shows an elevation of the interior surface of the concentrate end cover 230 of FIG. 5A. The interior face of the concentrate end cover 230 includes one or more impeller surfaces 514 disposed between a high pressure seal surface 316 and a low pressure concentrate port 310. The impeller surfaces 514 are configured to bias the spin of the rotor 202.

The interior face of the concentrate end cover 230 further includes one or more low pressure relief grooves 516 disposed between a low pressure seal surface 314 and a high pressure concentrate port 312. The low pressure relief grooves 516 are configured to bleed high pressure concentrate gradually from the high pressure concentrate port 312 into the duct 218 as the rotor 202 rotates to move the duct 218 over the low pressure relief grooves 516 from the low pressure seal surface 314 to the high pressure concentrate port 312. The impeller surface 514 along an edge of the low pressure concentrate port 310 is configured to impart rotation to the rotor 202 in the direction of the arrow. The impeller surface 514 provides torque to the rotor 202 reducing or eliminating a need for an external source to rotate the rotor, such as a motor. Impeller surface 512 may further bias rotor spin in a same direction as impeller surface 514. Note that the flow direction for low pressure concentrate port 310 is into the page and the flow direction for the high pressure concentrate port 312 is out of the page, and impeller surface 514 and 512 are on opposite sides of their respective ports. Thus, both impeller surfaces 512 and 514 provide torque to the rotor in the same direction, i.e. clockwise.

Figure 6A:
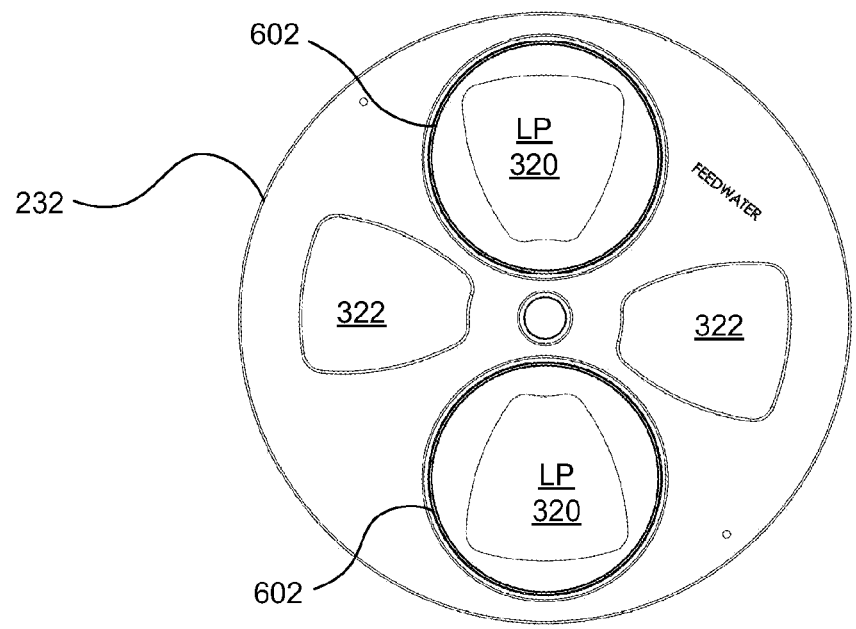
FIG. 6A shows an elevation of the exterior face of the feed-water end cover of FIG. 2, in accordance with embodiments of the invention.
Figure 6B:
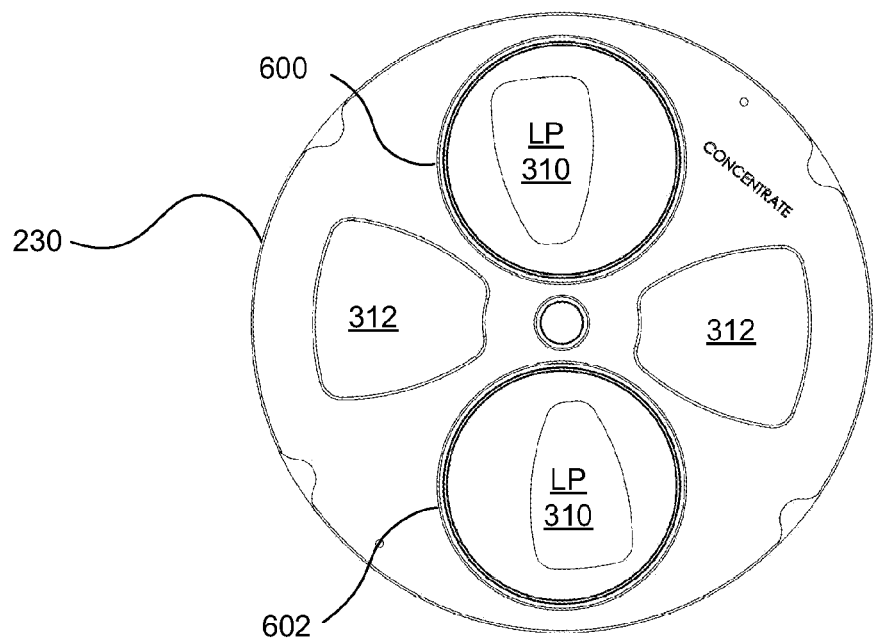
FIG. 6B shows an elevation of an exterior face of the concentrate end cover of FIG. 2, in accordance with embodiments of the invention.

FIG. 6A shows an elevation of the exterior face of the feed-water end cover 232 of FIG. 2, in accordance with embodiments of the invention. FIG. 6A illustrates circular fittings 602 for the low pressure feed-water ports for coupling to the low pressure feed-water manifold 242. FIG. 6B shows an elevation of an exterior face of the concentrate end cover 230 of FIG. 2, in accordance with embodiments of the invention. FIG. 6B illustrates circular fittings 600 for the low pressure concentrate ports for coupling to the low pressure concentrate manifold 240.

Figure 7A:
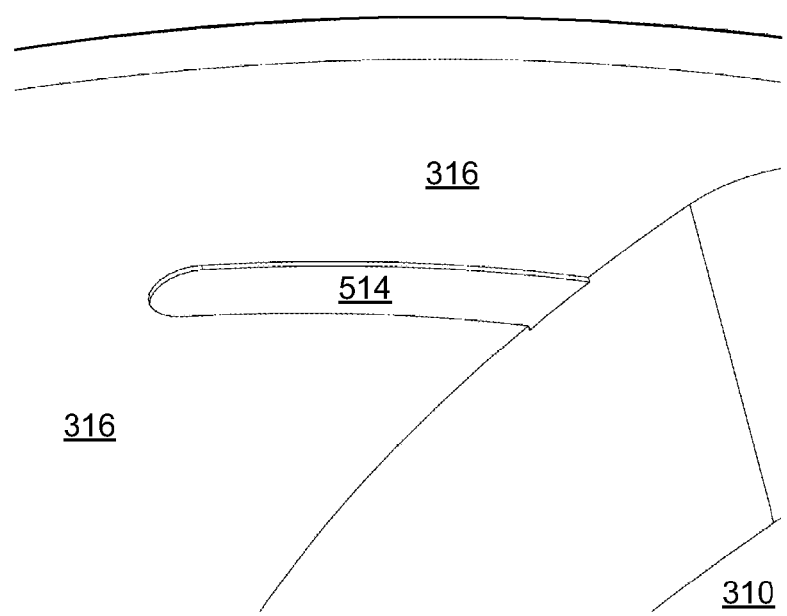
FIG. 7A illustrates a groove having a constant hydraulic diameter, in accordance with embodiments of the invention.
Figure 7B:
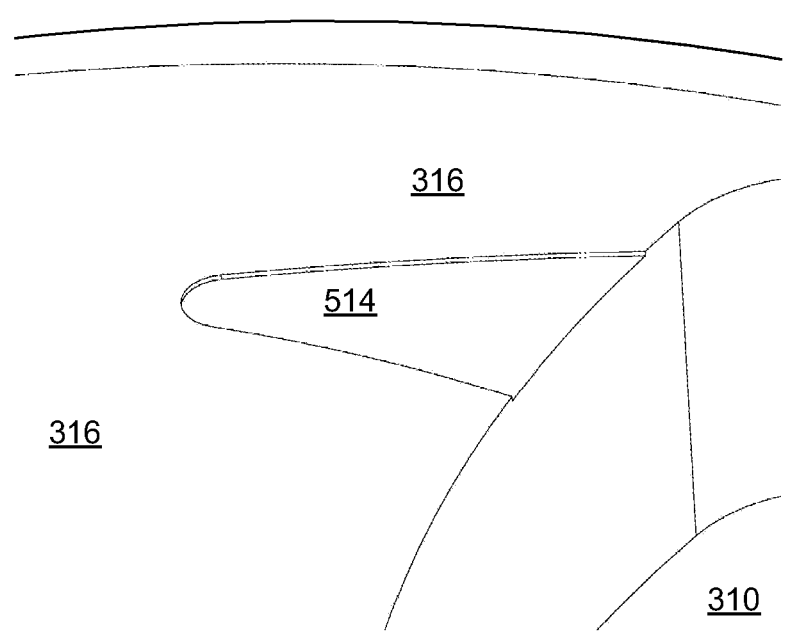
FIG. 7B illustrates a groove having an increasing hydraulic diameter, in accordance with embodiments of the invention.

FIG. 7A and FIG. 7B are perspective views of a groove 416 disposed between a low pressure seal surface 324 and a high pressure port 322. FIG. 7A is a perspective view illustrating the groove 416 having a constant hydraulic diameter, in accordance with embodiments of the invention. FIG. 7B is a perspective view illustrating the groove 416 having an increasing hydraulic diameter, in accordance with embodiments of the invention. The groove 416 is shallow having a depth substantially less than the width and/or length. This serves to increase the whetted area. The depth of the groove 416 may increase as it approaches the edge of the high pressure feed-water port 322, that is, the groove 416 in either FIG. 7A or 7B may slope downward toward high the pressure feed-water port 322, as illustrated elsewhere herein. While the groove 416 is illustrated in FIGS. 7A and 7B, the shape of the groove 416 may be used for grooves 414, 416, and 516. The grooves 416 of FIGS. 7A and 7B are shown as extending only a portion of the width of the high pressure feed-water port 322, similar to the grooves illustrated in FIGS. 9A, 9B, 10A and 10B (described in more detail below). However, the grooves 416 may extend most or all of the way across the width of the high pressure feed-water port 322, as illustrated in FIGS. 4A and 4B, or similar to the grooves illustrated in FIGS. 5A and 5B. In some embodiments, multiple grooves 416 are disposed along the width of the high pressure feed-water port 322.

Figure 8A:
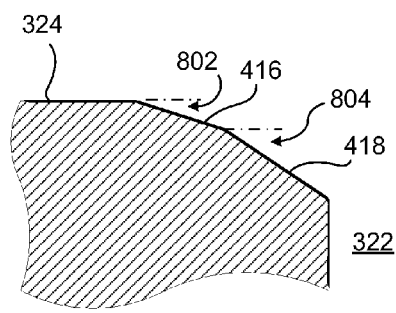
FIG. 8A is a longitudinal cross section of the groove of FIG. 4B taken along line b-b.

FIG. 8A is a longitudinal cross section of the impeller grooves 416-418 of FIG. 4B taken along line b-b. FIG. 8B is a transverse cross section of the groove 416 of FIG. 4B taken along line c-c. While FIG. 8B illustrates groove 416, this figure may similarly illustrate groove 414. While FIG. 8A illustrates groove 416 and impeller surface 418, this figure may similarly illustrate the groove 414. The groove 416 slopes downward at an angle 802 toward high pressure feed-water port 322, thus, increasing the effective hydraulic diameter of the groove 416. The groove 416 is shallow having a depth substantially less than the width and/or length. This serves to increase the whetted area. In various embodiments, the angle 802 is less than about 5, 4, 3, 2, 1, 0.5, 0.2, 0.1 degrees. The impeller surface 418 slopes downward at an angle 804. In various embodiments, the angle 804 is less than about 10, 9, 8, 7, 6, 5, 4, 3, 2, 1, 0.5, 0.2 degrees, but greater than the angle 802.

Figure 8C:
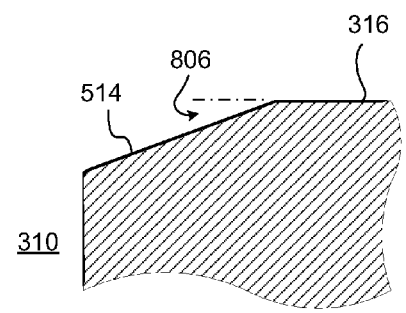
FIG. 8C is a longitudinal cross section of the groove of FIG. 5B taken along line d-d.
Figure 8B:
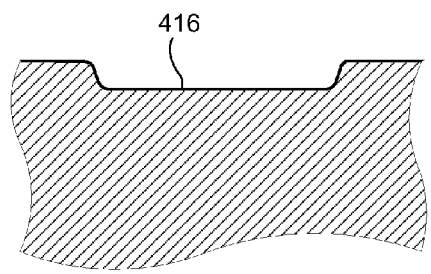
FIG. 8B is a transverse cross section of the groove of FIG. 4B taken along line c-c.
Figure 8D:
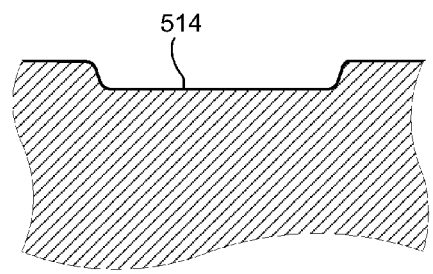
FIG. 8D is a transverse cross section of the groove of FIG. 5B taken along line e-e.

FIG. 8C is a longitudinal cross section of the groove 514 of FIG. 5B taken along line d-d. FIG. 8D is a transverse cross section of the groove 514 of FIG. 5B taken along line e-e. The impeller groove 514 slopes downward at an angle 806 toward the concentrate port 310, thus, increasing the effective hydraulic diameter of the impeller groove 514. In various embodiments, the angle 806 is less than about 5, 4, 3, 2, 1, 0.5, 0.2, 0.1 degrees. While FIGS. 8C and 8D illustrate the impeller groove 514, these figures may similarly illustrate the impeller surface 512 and/or groove 516.

Figure 9A:
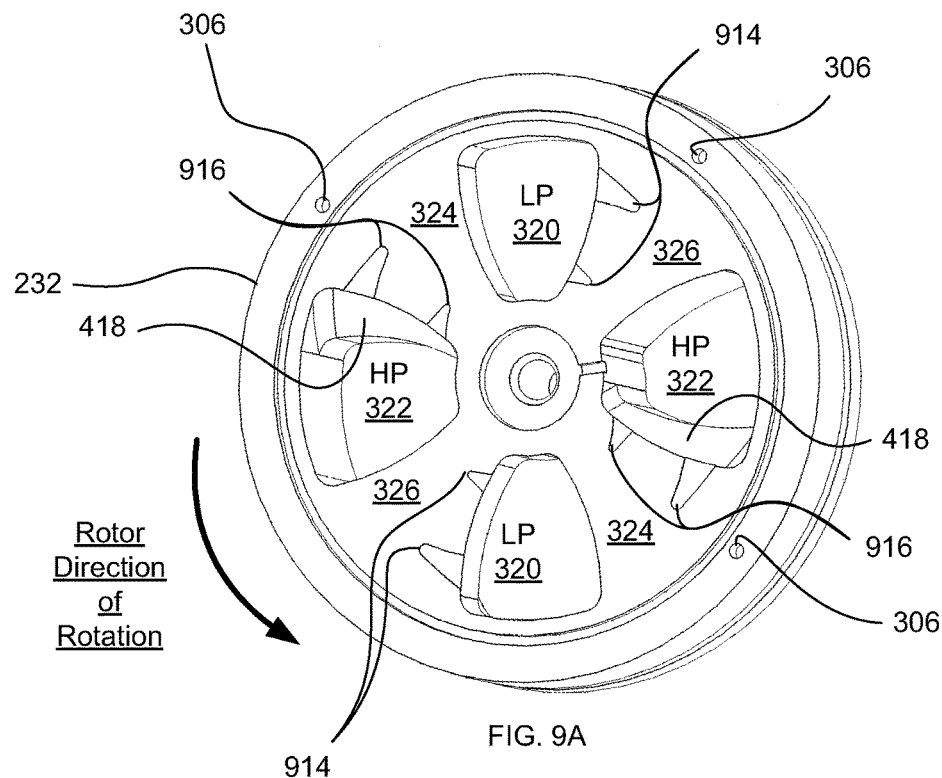
FIG. 9A shows a perspective view of an interior face of an alternative embodiment of the feed-water end cover of FIG. 4A 2, in accordance with embodiments of the invention.
Figure 9B:
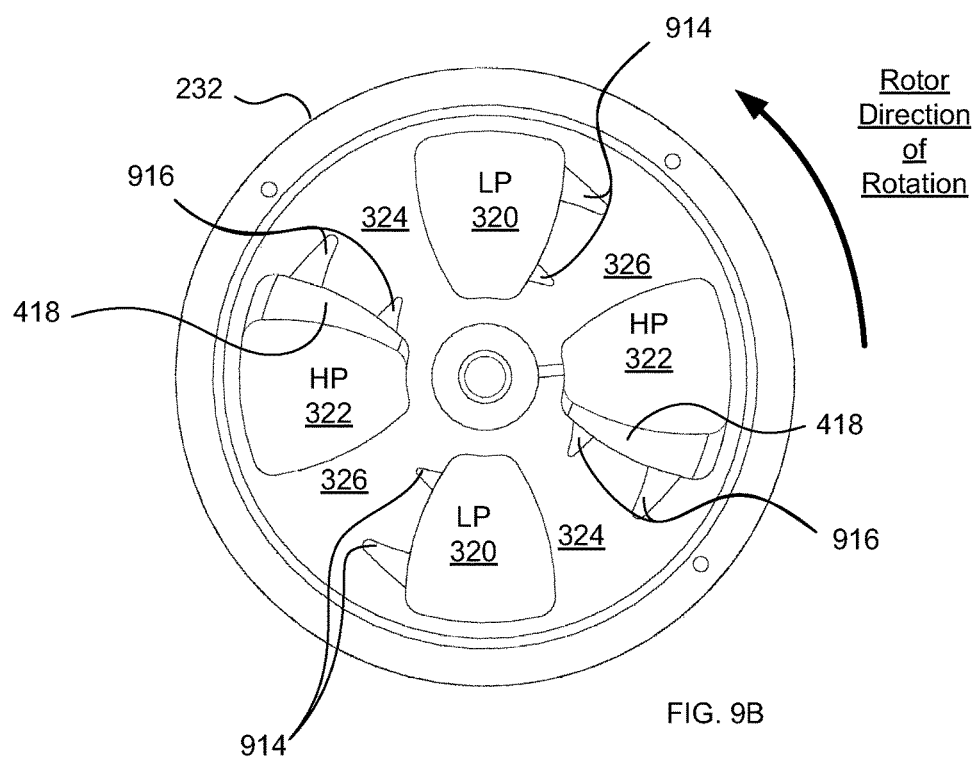
FIG. 9B shows an interior elevation of the feed-water end cover of FIG. 9A.

FIG. 9A shows a perspective view of an interior face of an alternative embodiment of the feed-water end cover 232 of FIG. 4A, in accordance with embodiments of the invention. FIG. 9B shows an interior elevation of the feed-water end cover 232 of FIG. 9A, in accordance with embodiments of the invention. FIGS. 9A and 9B differ from FIGS. 4A and 4B, respectively in that FIGS. 9A and 9B include multiple grooves 914 along a small portion of the edge of the low pressure feed-water port 320 instead of groove 414 disposed along a substantial or all of the edge of the low pressure feed-water port 320. Similarly, FIGS. 9A and 9B include grooves 916 instead of groove 416 along edge of the high pressure feed-water port 322.

The interior face of the feed-water end cover 232 includes one or more high pressure relief grooves 914 disposed between a high pressure seal surface 326 and a low pressure feed-water port 320. The high pressure relief grooves 914 are configured to bleed high pressure feed-water gradually from the duct 218 into the low pressure feed-water port 320 as the rotor 202 rotates to move the duct 218 over the high pressure relief grooves 914 from the high pressure seal surface 326 to the low pressure feed-water port 320.

The interior face of the feed-water end cover 232 further includes one or more low pressure relief grooves 916 disposed between a low pressure seal surface 324 and a high pressure feed-water port 322. The low pressure relief grooves 916 are configured to bleed high pressure feed-water gradually from the high pressure feed-water port 322 into the duct 218 containing low pressure feed-water as the rotor 202 rotates to move the duct 218 over the low pressure relief grooves 916 from the low pressure seal surface 324 to the high pressure feed-water port 322. An impeller surface 418 along an edge of the high pressure feed-water port 322 is configured to impart rotation to the rotor 202 in the direction of the arrow. The impeller surface 418 provides torque to the rotor 202 reducing or eliminating a need for an external source to rotate the rotor, such as a motor.

Figure 10A:
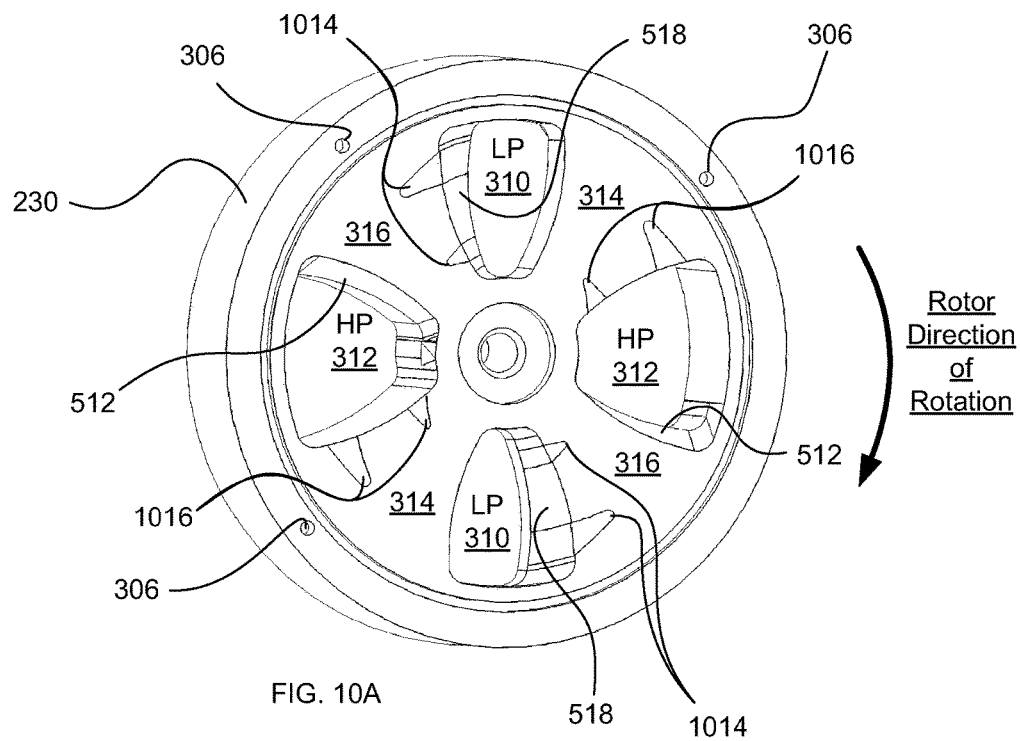
FIG. 10A shows a perspective view of an interior face of an alternative embodiment of the concentrate end cover of FIG. 5A, in accordance with embodiments of the invention.
Figure 10B:
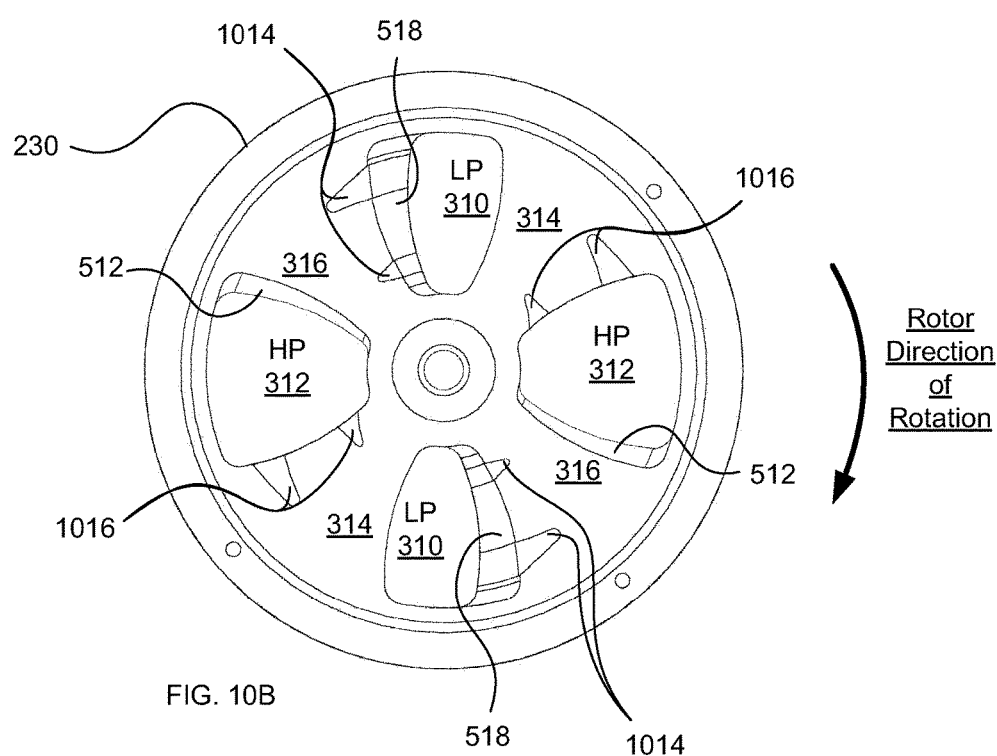
FIG. 10B shows an elevation interior surface of the concentrate end cover of FIG. 10A.

FIG. 10A shows a perspective view of an interior face of an alternative embodiment of the concentrate end cover of FIG. 5A, in accordance with embodiments of the invention. FIG. 10B shows an elevation interior surface of the concentrate end cover of FIG. 10A. FIGS. 10A and 10B differ from FIGS. 5A and 5B, respectively in that FIGS. 10A and 10B include multiple grooves 1014 along a small portion of the edge of concentrate port 310 instead of impeller groove 514 disposed along a substantial or all of the edge of the concentrate port 310. Similarly, FIGS. 10A and 10B include grooves 1016 instead of groove 516 along edge of the high pressure concentrate port 312.

The interior face of the concentrate end cover 230 includes one or more high pressure relief grooves 1014 disposed between a high pressure seal surface 316 and a low pressure concentrate port 310. The high pressure relief grooves 1014 are configured to bleed high pressure concentrate gradually from the duct 218 into the low pressure concentrate port 310 as the rotor 202 rotates to move the duct 218 over the high pressure relief grooves 1014 from the high pressure seal surface 316 to the low pressure concentrate port 310.

The interior face of the concentrate end cover 230 further includes one or more low pressure relief grooves 1016 disposed between a low pressure seal surface 314 and a high pressure concentrate port 312. The low pressure relief grooves 1016 are configured to bleed high pressure concentrate gradually from the high pressure concentrate port 312 into the duct 218 as the rotor 202 rotates to move the duct 218 over the low pressure relief grooves 1016 from the low pressure seal surface 314 to the high pressure concentrate port 312. An impeller surface 518 along an edge of the low pressure concentrate port 310 is configured to impart rotation to the rotor 202 in the direction of the arrow. The impeller surface 518 provides torque to the rotor 202 reducing or eliminating a need for an external source to rotate the rotor, such as a motor. Surface 512 may further bias rotor spin in a correct or desired direction.

As used in this specification, the terms "include," "including," "for example," "exemplary," "e.g.," and variations thereof, are not intended to be terms of limitation, but rather are intended to be followed by the words "without limitation" or by words with a similar meaning. Definitions in this specification, and all headers, titles and subtitles, are intended to be descriptive and illustrative with the goal of facilitating comprehension, but are not intended to be limiting with respect to the scope of the inventions as recited in the claims. Each such definition is intended to also capture additional equivalent items, technologies or terms that would be known or would become known to a person having ordinary skill in this art as equivalent or otherwise interchangeable with the respective item, technology or term so defined. Unless otherwise required by the context, the verb "may" indicates a possibility that the respective action, step or implementation may be performed or achieved, but is not intended to establish a requirement that such action, step or implementation must be performed or must occur, or that the respective action, step or implementation must be performed or achieved in the exact manner described.

The above description is illustrative and not restrictive. This patent describes in detail various embodiments and implementations of the present invention, and the present invention is open to additional embodiments and implementations, further modifications, and alternative constructions. There is no intention in this patent to limit the invention to the particular embodiments and implementations disclosed; on the contrary, this patent is intended to cover all modifications, equivalents and alternative embodiments and implementations that fall within the scope of the claims. Moreover, embodiments illustrated in the figures may be used in various combination. Any limitations of the invention should, therefore, be determined not with reference to the above description, but instead should be determined with reference to the appended claims along with their full scope of equivalents.

What is claimed is:

1. An energy recovery apparatus comprising:
   a rotor including a duct and configured to move the duct and low pressure fluid in the duct to a first position, and to move the duct and high pressure fluid in the duct to a second position;
   a high pressure input port disposed in a first end cover, the high pressure input port configured to admit high pressure fluid for compressing low pressure fluid and displacing compressed fluid while the rotor is in the first position;
   a high pressure output port disposed in a second end cover, the high pressure output port configured to release compressed fluid while the rotor is in the first position;
   a low pressure output port disposed in the first end cover, the low pressure output port configured to release decompressed high pressure fluid from the duct at low pressure while the duct is at the second position;
   a low pressure input port disposed in the second end cover, the low pressure input port configured to admit low pressure fluid into the duct to displace decompressed fluid while the duct is at the second position;
   a first high pressure seal surface in the second end cover and adjacent the low pressure input port; and
   a first groove disposed on a first outer surface of the second end cover and between the first high pressure seal surface and the low pressure input port, the first groove configured to release pressure and decompress high pressure fluid in the duct as the rotor moves the duct over the first groove and into alignment with the low pressure input port, wherein the first groove extends through only a portion of the first outer surface of the second end cover such that an innermost surface of the first groove forms at least a portion of the first outer surface of the second end cover; and
   a second high pressure seal surface in the first end cover and adjacent the low pressure output port.

2. The apparatus of claim 1, further comprising a second groove disposed on a second outer surface of the first end cover and between the second high pressure seal surface and the low pressure output port, the second groove configured to release pressure and decompress high pressure fluid in the duct as the rotor moves the duct into alignment with the low pressure output port.

3. The apparatus of claim 1, further comprising:
   a first low pressure seal surface in the first end cover and adjacent the high pressure input port;
   a third groove disposed on a second outer surface of the first end cover and between the first low pressure seal surface and the high pressure input port, the third groove configured to increase pressure and compress low pressure fluid in the duct as the rotor moves the duct over the third groove and into alignment with the high pressure input port;
   a second low pressure seal surface in the second end cover and adjacent the high pressure output port; and
   a fourth groove disposed on the first outer surface of the second end cover and between the second low pressure seal surface and the high pressure output port, the fourth groove configured to increase pressure and compress low pressure fluid in the duct as the rotor moves the duct into alignment with the high pressure output port.

4. The apparatus of claim 1, further comprising a membrane separation device configured to extract a concentrate from high pressure feed-water.

5. The apparatus of claim 4, wherein:
the high pressure input port is configured to admit high pressure concentrate from the membrane separation device,
the low pressure output port is configured to release concentrate at low pressure,
the low pressure input port is configured to admit feed-water at low pressure from a low pressure pump, and
the high pressure output port is configured to release feed-water at high pressure for communication to the membrane separation device.

6. The apparatus of claim 1, wherein the first groove has parallel sides.

7. The apparatus of claim 1, wherein the first groove has tapered sides.

8. The apparatus of claim 1, wherein the first groove has a constant depth over a more than half the length of the groove.

9. The apparatus of claim 1, wherein the depth of the first groove increases approaching the low pressure output port.

10. An energy recovery apparatus comprising:
a rotor configured to move a duct containing low pressure fluid into alignment with a high pressure fluid source port for replacement of low pressure fluid in the duct with high pressure fluid, the rotor further configured to move the duct while containing high pressure fluid into alignment with a low pressure release port for release of the high pressure fluid within the duct to low pressure;
a high pressure seal surface adjacent to the low pressure release port, the high pressure seal surface for maintaining high pressure on fluid in the duct during movement of the duct into alignment with the low pressure release port; and
a first groove disposed on an outer surface of an end cover and extending through only a portion of the outer surface of the end cover such that an innermost surface of the first groove forms at least a portion of the outer surface, wherein the first groove is configured to be coupled to the rotor, wherein the groove forms a transition between the high pressure seal surface and the low pressure release port, the first groove configured to bleed off pressure from fluid in the duct as the rotor moves the duct over the first groove into alignment with the low pressure release port, and wherein the outer surface is at an interface between the end cover and the rotor.

11. The apparatus of claim 10, further comprising:
a low pressure seal surface adjacent the high pressure fluid source port, the low pressure seal surface for maintaining low pressure on fluid in the duct during movement of the duct into alignment with the high pressure fluid source port; and
a second groove disposed on the outer surface of the end cover and forming a transition between the low pressure seal surface and the high pressure fluid source port, the second groove configured to bleed high pressure fluid into the duct from the high pressure fluid source port as the rotor moves the duct over the second groove into alignment with the high pressure fluid source port.

12. The apparatus of claim 10, further comprising a shell enclosing the rotor and including an aperture for admitting high pressure fluid into a space between the shell and the rotor for suspending the rotor during rotation within the shell.

13. The apparatus of claim 10, further comprising an impeller disposed in the low pressure port and configured to impart a rotation to the rotor.

14. The apparatus of claim 10, wherein the first groove forms an impeller surface configured to impart rotational force to the rotor.

15. The apparatus of claim 10, wherein the first groove includes a radius.

16. The pressure recovery device comprising:
a feed-water end cover;
a low pressure feed-water source port disposed in the feed-water end cover;
a concentrate end cover;
a high pressure concentrate source port disposed in the concentrate end cover;
a duct configured to receive low pressure feed-water from the low pressure feed-water source port and high pressure concentrate from the high pressure concentrate source port;
a rotor configured to position the duct in alignment with the low pressure feed-water source port, and to position the duct in alignment with the high pressure concentrate source port;
a high pressure sealing surface in a first face of the feed-water end cover and adjacent the low pressure feed-water source port, the high pressure sealing surface configured for maintaining high pressure on concentrate; and
a first groove disposed on the first face of the feed-water end cover between the high pressure sealing surface and the low pressure feed-water source port, the first groove configured to release pressurized concentrate from the duct, wherein the face is at an interface between the feed-water end cover and the rotor, wherein the first groove forms a recess on the first face of the feed-water end cover.

17. The device of claim 16, further comprising:
a low pressure sealing surface in a second face of the concentrate end cover and adjacent the high pressure concentrate source port, the low pressure sealing surface for maintaining low pressure on feed-water; and
a second groove disposed on the second face of the concentrate end cover between the low pressure sealing surface and the high pressure concentrate source port, the second groove configured to admit concentrate from the high pressure concentrate source port into the duct for increasing pressure on the feed-water in the duct.

18. The device of claim 16, further comprising:
a high pressure feed-water release port disposed in the feed-water end cover, the high pressure feed-water release port configured release high pressure feed-water from the duct;
a low pressure feed-water sealing surface in the feed-water end cover and adjacent the high pressure feed-water release port, the low pressure sealing surface for maintaining low pressure on feed-water; and
a third groove disposed on the first face of the feed-water end cover between the low pressure feed-water sealing surface and the high pressure feed-water release port, the third groove configured to admit feed-water from the high pressure feed-water release port for increasing pressure on feed-water in the duct.

19. The device of claim 16, further comprising:
a low pressure concentrate release port disposed in a second face of the concentrate end cover, the low pressure concentrate release port configured to release concentrate from the duct;
a high pressure concentrate sealing surface in the concentrate end cover and adjacent the low pressure concentrate release port, the high pressure sealing surface for maintaining high pressure on concentrate; and
a fourth groove disposed on the second end face and beginning in the high pressure concentrate sealing surface and ending in the low pressure concentrate release port, the fourth groove configured to release concentrate to the low pressure concentrate release port for decreasing pressure on concentrate in the duct.

20. An end cover for an energy recovery apparatus including a rotor configured to rotate a duct containing a fluid, the end cover comprising:
a low pressure port;
a high pressure seal surface disposed on an end face of the end cover and adjacent the low pressure port, the high pressure seal surface configured to maintain high pressure on fluid in the duct during rotation of the duct; and
a groove disposed on the end face of the end cover and between the high pressure seal surface and the low pressure port, the groove configured for decreasing pressure on the fluid in the duct at a substantially constant rate, wherein the groove extends through only a portion of the end cover such that the groove forms a recess on the end face.

21. The end cover of claim 20, wherein the groove uses a change in effective hydraulic diameter for decreasing pressure on the fluid in the duct at a substantially constant rate.

22. The end cover of claim 21, wherein the groove slopes downward toward the low pressure port to change the effective hydraulic diameter of the groove.

* * * * *